(12) United States Patent
Maar

(10) Patent No.: US 12,709,173 B2
(45) Date of Patent: Aug. 18, 2026

(54) ELECTRIC VEHICLE, ONBOARD CHARGER, METHOD AND COMPUTER PROGRAM

(71) Applicant: Lightyear IPCO B.V., Helmond (NL)

(72) Inventor: Jeroen Richard Gertruda Maar, Eindhoven (NL)

(73) Assignee: Lightyear IPCo B.V., Helmond (NL)

( * ) Notice: Subject to any disclaimer, the term of this patent is extended or adjusted under 35 U.S.C. 154(b) by 170 days.

(21) Appl. No.: 18/728,505

(22) PCT Filed: Jan. 16, 2023

(86) PCT No.: PCT/EP2023/050864
§ 371 (c)(1),
(2) Date: Jul. 12, 2024

(87) PCT Pub. No.: WO2023/135294
PCT Pub. Date: Jul. 20, 2023

(65) Prior Publication Data

US 2025/0108714 A1 Apr. 3, 2025

(30) Foreign Application Priority Data

Jan. 17, 2022 (NL) ...................................... 2030569

(51) Int. Cl.
*B60L 53/22* (2019.01)
*H02H 1/00* (2006.01)
*H02H 3/16* (2006.01)

(52) U.S. Cl.
CPC ........... *B60L 53/22* (2019.02); *H02H 1/0015* (2013.01); *H02H 3/16* (2013.01); *B60L 2210/30* (2013.01)

(58) Field of Classification Search
CPC ........ B60L 53/22; B60L 2210/30; B60L 3/00; B60L 3/04; B60L 53/20; B60L 53/14;
(Continued)

(56) References Cited

U.S. PATENT DOCUMENTS 6,373,257 B1 4/2002 Macbeth et al.
2002/0179346 A1 * 12/2002 Dollar, II ............ H02H 1/0015 180/65.1

(Continued)

FOREIGN PATENT DOCUMENTS

JP 2013132169 A * 7/2013

OTHER PUBLICATIONS

International Search Report and Written Opinion in related application PCT/EP2023/050864 dated Apr. 5, 2023.

(Continued)

*Primary Examiner* — Sreeya Sreevatsa
(74) *Attorney, Agent, or Firm* — Patterson + Sheridan, LLP

(57) ABSTRACT

There is provided an electric vehicle comprising an electric circuitry. The electric circuitry comprises a battery and an onboard charger. The battery is configured to store electric energy. The onboard charger and the battery are arranged to form a DC circuit to transfer the electric energy as DC power between the onboard charger and the battery. The onboard charger is configured to convert the electric energy between DC power and AC power. The onboard charger is configured to be coupled to an external electric circuit to form an AC circuit to transfer the electric energy as AC power between the onboard charger and the external electric circuit. The onboard charger is configured to detect an arc fault in the AC circuit.

23 Claims, 3 Drawing Sheets

Figure 1:
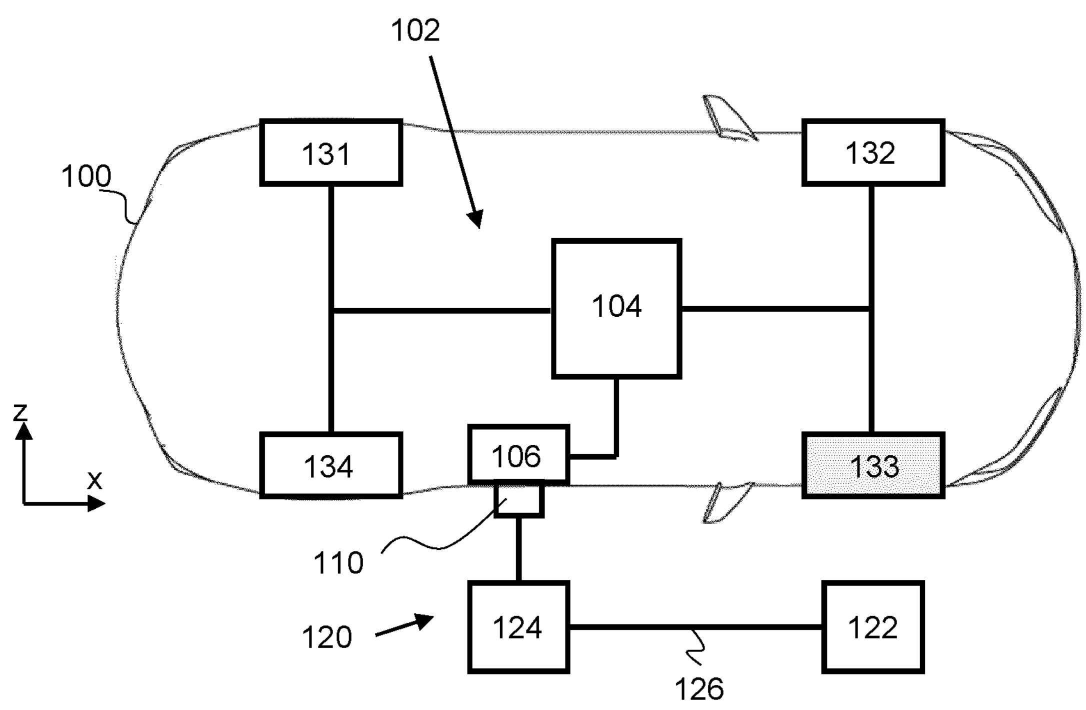

(58) Field of Classification Search
CPC ........ H02H 1/0015; H02H 3/16; H02H 3/087; G01R 31/52; Y02T 10/70; Y02T 10/7072; Y02T 90/14; H02J 2207/20
USPC .............................................................. 361/1
See application file for complete search history.

(56) References Cited

U.S. PATENT DOCUMENTS

| | | | | |
|---|---|---|---|---|
| 2013/0190968 | A1 | 7/2013 | Nitzberg et al. | |
| 2014/0021779 | A1 | 1/2014 | Teichmann | |
| 2014/0211345 | A1 | 7/2014 | Thompson et al. | |
| 2017/0054286 | A9* | 2/2017 | Haines | G01R 31/54 |
| 2018/0269013 | A1* | 9/2018 | Thompson | B60L 53/665 |
| 2020/0130521 | A1* | 4/2020 | Ichikawa | H02M 1/32 |
| 2022/0224136 | A1* | 7/2022 | Friedrich | B60L 53/18 |

OTHER PUBLICATIONS

Search Report in related application NL 2030659 dated Aug. 30, 2022.

* cited by examiner

ELECTRIC VEHICLE, ONBOARD CHARGER, METHOD AND COMPUTER PROGRAM

The invention relates to an electric vehicle having an onboard charger. The invention further relates to an onboard charger for use in an electric vehicle. The invention further relates to a method for detecting an arc fault using the electric vehicle. The invention further relates to a computer program having instructions to be executed by a computing device of an onboard charger.

An electric vehicle is a vehicle that uses electric energy to drive a motor to propel the vehicle. Typically, the electric vehicle is provided with a battery to store electric energy. To charge the battery, the electric vehicle is provided with a coupling device to connect the vehicle to the power grid. When the vehicle is parked, for example at home or at a parking, connecting the vehicle to the power grid allows the battery to be charged.

The battery requires the electric energy to be provided as DC power to store the electric energy. The battery also provides the electric energy as DC power. However, the power grid provides the electric energy as AC power, typically at 110 V or 230V at a frequency of 50 Hz or 60 Hz. To convert the AC power to DC power, the electric vehicle has an onboard charger.

The onboard charger has two main functions. The first function is to convert the AC power from the power grid to DC power, so the battery can store the electrical energy. The second function is that the onboard charger controls the amount of DC power that is directed to the battery. For example, the onboard charger limits the amount of electric current through the battery or reduces the voltage of the DC power in case the battery has a low state of charge. Because the onboard charger is arranged in the electric vehicle, the electric vehicle is not dependent on the presence of a dedicated charger at a charging location. Instead, a regular connection to the electric power grid is sufficient to charge the battery using the onboard charger.

An electric circuit may suffer from arc faults. An arc fault is a high power discharge between two or more conductors. A common cause for such a discharge is damaged electrical wires in the electric circuit. If the insulating layers of two adjacent electrical wires are damaged, a voltage difference between the two electrical wires may cause an electrical discharge between the two electrical wires. Another common cause for an arc fault is a poor electrical connection in the electric circuit. The poor electrical connection may cause to repeatedly interrupt and reconnect the electric circuit. A voltage on the electrical connection may cause an arc at the electrical connection. The arc fault may cause a large amount of heat, causing further damage to the electrical wires and electrical connections. The arc fault may lead to fire.

If an arc fault occurs, this does not trip a fuse or an earth leakage break circuit. Despite that the arc fault generates a lot of heat, the electric current caused by the arc fault is typically not enough to exceed the threshold of the fuse. Also, the arc fault does not lead to any event that would trip the earth leakage break circuit.

To protect an electric circuit from arc faults, dedicated arc fault protection devices are available. A known arc fault protection device is disclosed in U.S. Pat. No. 6,414,829. The known arc fault protection device is arranged in the fuse box. The fuse box is connected to the power grid. Electric power is provided from the fuse box, via the arc fault protection device to a power outlet. If a device connected to the power outlet suffers an arc fault, the arc fault protection device simulates a ground fault, causing the ground fault circuit interrupter to interrupt the electric circuit.

Despite the safety features of arc fault protection devices, they are not very common in many countries. Also, if people want to use arc fault protection devices at home, in many cases they would need to replace the fuse box in their homes. Such a replacement is costly.

It is an object of the invention to provide an electric vehicle with an onboard charger that increases the safety of the electric circuit involved with charging the battery of the electric vehicle, or to at least provide an alternative.

The object of the invention is achieved by an electric vehicle comprising an electric circuitry. The electric circuitry comprises a battery and an onboard charger. The battery is configured to store electric energy. The onboard charger and the battery are arranged to form a DC circuit to transfer the electric energy as DC power between the onboard charger and the battery. The onboard charger is configured to convert the electric energy between DC power and AC power. The onboard charger is configured to be coupled to an external electric circuit to form an AC circuit to transfer the electric energy as AC power between the onboard charger and the external electric circuit. The onboard charger is configured to detect an arc fault in the AC circuit.

If an arc fault occurs in the external electric circuit, the arc fault causes variation in the voltage and/or the electric current of the external electric circuit. There are many causes for variation in the voltage and/or the electric current in the external electric circuit. For example, switching high power appliances coupled to the external electric circuit on or off would cause variation. For example, a sudden increase or decrease of power supplied by a solar panel coupled to the external electric circuit would cause variation. However, despite all these variations, the variation caused by the arc fault has a typical frequency content or a typical variation over time. Because the onboard charger is coupled to the external electric circuit, the arc fault occurring in the external electric circuit becomes visible in the AC circuit. As a result, the arc fault becomes visible to the onboard charger. The onboard charger is configured to identity the variation caused by the arc fault. This way the onboard charger is able to detect the arc fault in the external electric circuit, improving the safety of the external electric circuit. The safety is improved without the need to adjust the fuse box of the external electric circuit. The safety is improved by simply coupling the electrical vehicle to the external electric circuit. After the onboard charger has detected the arc fault, the external electric circuit may need to be repaired to prevent the arc fault from occurring in the future. For example, damaged wiring of the external electric circuits is replaced, or an electrical connection is properly reconnected.

The electric vehicle is, for example, a land vehicle such as a car or a bus or a truck. The electric vehicle is, for example, a watercraft such as boat or a ship or a vessel. The electric vehicle has at least one electric motor to propel the vehicle. For example, the electric motor is adapted to propel the vehicle via a propeller, or a screw or a wheel. For example, the vehicle has multiple electric motors. For example, each of the multiple electric motors is coupled to a corresponding wheel to drive the corresponding wheel. For example, the electric motor is an inwheel motor. The electric vehicle has the battery to provide electric energy to the electric motor. For example, the vehicle has, in addition to the battery, a fuel tank, a combustion engine and a generator. The combustion engine is configured to combust fuel from the fuel tank to drive the generator. The generator is configured to generate electric energy. The generator provides the electric energy to the battery, to the electric motor or both the battery and the electric motor. The electric vehicle is, for example, an electric bicycle. The electric bicycle has an electric motor to provide some of the power to propel the electric bicycle. The electric bicycle has peddles coupled to a wheel of the electric bicycle to provide further power to propel the electric bicycle.

The electric circuitry comprises the battery and the onboard charger. The electric circuitry is, for example, a single electric circuit or a system of multiple electric circuits that are coupled to each other. The electric circuitry comprises, for example, a safety device such as a fuse or a circuit breaker. The electric circuitry comprises, for example, various other electric components. Such electric components are, for example, drive train components for driving the vehicle, like an inverter configured to invert the DC power provided by the battery to AC power required by the electric motor. The electric circuitry comprises, for example, appliances for use in the cabin of the vehicle, such as a radio, or a dashboard display, or electrically operated windows. The electric circuitry comprises, for example, various electric controllers, such as a cruise control system configured to control a speed of the electric vehicle, or a thermal control system configured to control a temperature of the vehicle, or an emergency brake control system configured to control the brakes of the vehicle in an emergency. The electric circuitry provides, for example, electric energy at different voltages to the electric components in the electric vehicle.

The battery is configured to store electric energy. For example, the battery is a lithium Ion (Li-Ion) battery, a molten salt ($Na—NiCl_2$) battery, a nickel metal hybrid (Ni-MH) battery, or a lithium sulphur (Li—S) battery. The battery is for example a single battery or comprises a plurality of batteries. The plurality of batteries are, for example, electrically arranged in parallel, in series, or in a combination of in parallel and in series. The plurality of batteries have the same maximum voltage or different maximum voltages. For example, the electric vehicle has a low voltage battery and a high voltage battery. The low voltage battery has, for example, a maximum voltage of 5 V or 12 V or 48 V. The high voltage battery has, for example, a maximum voltage of 60 V or 300 V or 400 V. For example, the high voltage battery provides electric energy to the drive train of the electric vehicle, such as the electric motor. For example, the low voltage battery provides electric energy to auxiliary components of the electric vehicle, such as the HVAC-system, and a lighting system.

The onboard charger is configured to convert electric energy between DC power and AC power. In case the battery is being charged with electrical energy from the external electric circuit, the onboard charger converts the AC power from the external electric circuit to DC power, and provides the electric energy as DC power to the battery. The onboard charger is configured to safely charge the battery. For example, the onboard charger limits the maximum current through the battery. For example, the onboard charger adjusts the voltage of the DC power in response to the voltage of the battery. In case the battery has a low state of charge, the voltage of the battery may be low. If the DC power is too high, the current through the battery may become too high. The onboard charger is configured to adjust the voltage of the DC power to an acceptable voltage. The onboard charger is, for example, configured to provide electric energy to multiple batteries. For example, the onboard charger has multiple DC power outputs to provide the electric energy to multiple batteries. For example, each DC power output has a voltage different from the other DC power outputs.

In an example, the onboard charger is configured to transfer electric energy from the battery to the external electric circuit. For example, the electric vehicle comprises a solar panel. In case the electric vehicle does not need the electric energy from the solar panel, for example in case the battery is fully charged, the electric energy from the solar panel is transferred to the external electrical circuit. To do this, the onboard charger converts the electrical energy from the battery from DC power to AC power. The electrical energy as AC power is then transferred to the external electrical circuit.

The external electric circuit circuit is referred to as 'external' because the external electric circuit is an electric circuit that does not form part of the vehicle. The external electric circuit is an AC circuit. The external electric circuit has a phase wire, a neutral wire and a ground wire. An AC voltage is applied to the phase wire. When the AC circuit is closed, a current runs through the AC circuit. The current runs through the phase wire and the neutral wire. The ground wire is connected to a ground. The external electric circuit is, for example, the electric circuit of a house. The external electric circuit is, for example, the electric circuit of a public charging station. The external electric circuit is, for example, connected to the power grid. The external electric circuit has safety mechanisms such as a circuit breaker and an earth leakage breaker circuit. The circuit breaker interrupts the external electric circuit if a current through the circuit breaker exceeds a threshold. The earth leakage breaker circuit interrupts the external electric circuit if a voltage or a current is applied to a ground wire.

The voltage amplitude and phase of the AC power is, for example, defined by the external electric circuit. In case the onboard charger is configured to provide electric energy as AC power to the external electric circuit, the onboard charger is configured to match the voltage amplitude and the phase of the AC power to the external electric circuit.

In an embodiment, the onboard charger is configured to detect the arc fault in the external electric circuit.

According to the embodiment, the onboard charger is configured to detect the arc fault outside the vehicle. When the onboard charger is coupled to the external electric circuit, the onboard charge is able to detect an arc fault occurring in the external electric circuit. This way, even when the external electric circuit is not provided with an arc fault detector, an arc fault can be detected every time the vehicle is coupled to the external electric circuit.

In an embodiment, the onboard charger is configured to trip a safety mechanism of the external electric circuit when detecting the arc fault.

According to the embodiment, the external electric circuit has a safety mechanism, such as a fuse or a circuit breaker or an earth leakage circuit breaker or a combination thereof. All or almost all electric circuits that are suitable for charging the battery of an electric vehicle are provided with one or more of such safety mechanisms. Such electric circuits are typically required to have the safety mechanisms because of safety regulations. Such safety regulations require that circuit breakers and earth leakage circuit breakers are provided in electric circuits in housing and office buildings. An example of such a safety regulation is the Dutch NEN 1010 regulation. The onboard charger makes use of the safety mechanism of the external electric circuit. When the onboard charger detects an arc fault in the external electric circuit, the onboard charger trips the safety mechanism. This leads to an interruption of the external electric circuit. Because of the interruption, the arc fault stops to exist. This way, damage caused by the arc fault is prevented or limited. In most electric circuits, the safety mechanism are arranged at an upstream location of the external electric circuit, for example in the fuse box at which a main power line is connected to various groups of electric circuits. The safety mechanisms are placed at the upstream location to ensure that if the safety mechanism is tripped, a large portion or all of the electric circuit is interrupted. By interrupting the large portion or all of the electric circuit, no voltage is applied to the electric circuit anymore, or at least to a large portion thereof. By interrupting the large portion or all of the electric circuit, no current flows through the electric circuit anymore, or at least not through a large portion there off. Because the onboard charge trips a safety mechanism when detecting the arc fault, there is a very high chance that the part of the external electric circuit in which the arc fault occurs is interrupted. Due to the interruption, the arc fault no longer occurs. In case the onboard charger would only disconnect from the external electric circuit when detecting an arc fault in the external electric circuit, there is a high chance that the arc fault maintains even if the onboard charger is disconnected from the external electric circuit.

In an embodiment, the onboard charger is configured to trip the safety mechanism of the external electric circuit by creating a short circuit in the AC circuit.

According to the embodiment, the onboard charger causes a short circuit in the AC circuit if the onboard charger detects an arc fault in the external electrical circuit. For example, the onboard charger comprises a switch that is adapted to couple the phase wire of the AC circuit directly to the neutral wire of the AC circuit. When the onboard charger does not detect an arc fault, the switch does not couple the phase wire to the neutral wire of the AC circuit. When the onboard charger detects an arc fault, the switch is flipped to couple the phase wire to the neutral wire of the AC circuit. Due to the lack of sufficient electrical resistance, the flipping of the switch causes a large current via the switch from the phase wire to the neutral wire of the AC circuit. The large current trips a circuit breaker in the external electric circuit. For example, the electrical resistance of the switch is low enough to create a large current of 16 A or 20 A. The onboard charger is, for example, adapted to set the switch only a small amount of time in the setting that couples the phase wire to the neutral wire of the AC circuit. The small amount of time is sufficient to trip the circuit breaker of the external electric circuit. However, in case the circuit breaker does not work, the small amount of time is small enough to prevent damage from the short circuit. For example, the onboard charger is adapted to couple the phase to the neutral of the AC circuit via the switch for less than 1 second, for example, less than 300 ms, or less than 90 ms or less than 20 ms.

In an embodiment, the onboard charger is configured to be coupled to a ground wire of the external electric circuit. The onboard charger is configured to trip the safety mechanism by providing a current and/or a voltage to the ground wire.

According to this embodiment, the onboard charger is able to couple to a ground wire of the external electric circuit. During normal operation of the external electric circuit, no voltage and no current is provided to the ground wire. During normal operation, voltages and currents are applied using the phase wire and the neutral wire of the external electric circuit. When the onboard charger detects an arc fault in the external electric circuit, the onboard charger provides a current and/or a voltage to the ground wire. For example, the onboard charger has a switch that is adapted to couple the phase wire of the AC circuit to the ground wire of the AC circuit. When the onboard charger does not detect an arc fault, the switch does not couple the phase wire to the ground wire of the AC circuit. When the onboard charger detects an arc fault, the switch is flipped to couple the phase wire to the ground wire of the AC circuit. This causes a current to flow through the ground wire. Because of the current through the ground wire, a difference is caused between the current through the phase wire and the current through the neutral wire. The difference causes the earth leakage circuit breaker of the external electric circuit to trip. The tripping of the earth leakage circuit breaker interrupts the external electric circuit. In another example, the onboard charger has a switch that is adapted to couple the neutral wire of the AC circuit to the ground wire of the AC circuit. When the onboard charger detects an arc fault, the switch is flipped to couple the neutral wire to the ground wire of the AC circuit. This causes a current to flow through the ground wire. Because of the current through the ground wire, a difference is caused between the current through the phase wire and the current through the neutral wire. The difference causes the earth leakage circuit breaker of the external electric circuit to trip. The tripping of the earth leakage circuit breaker interrupts the external electric circuit.

In an embodiment, the onboard charger comprises a low-pass filter for filtering the AC power signal as received by the charger from the external electric circuit. In particular, the low-pass filter can be arranged in the AC circuit as formed. In such an embodiment, the detection of the arc fault by the onboard charger can take place upstream of the low-pass filter (330). Within the meaning of the present invention, upstream refers to a direction from the onboard charger towards the external electric circuit.

In an embodiment, the onboard charger comprises a sensor configured to generate a signal based on a property of the AC circuit. The onboard charger is configured to detect the arc fault based on the signal.

According to the embodiment, the sensor of the onboard charger is arranged to determine a property of the AC circuit. For example, the sensor is arranged in a part of the onboard charger through which an AC current flows. The AC current originates from the AC circuit. For example, the sensor is arranged in a part of the onboard charger at which an AC voltage is applied. For example, the sensor is coupled to a phase wire and/or a neutral wire of the onboard charger. The phase wire of the onboard charger is arranged to couple to the phase wire of the external electric circuit. The neutral wire of the onboard charger is arranged to couple to the neutral wire of the external electric circuit. In case the onboard charger comprises a low-pass filter, the mentioned sensor can e.g. be arranged upstream of the low-pass filter.

In an embodiment, the onboard charger is configured to convert the electric energy between DC power and AC power under control of the signal from the sensor.

In this embodiment, the onboard charger uses the sensor for an additional purpose than detecting an arc fault. The onboard charger determines how to convert the electric energy between DC power and AC power based on the signal from the sensor. For example, based on the signal from the sensor, the onboard charger determines the amount of AC power that is being received from the external electric circuit. The onboard charger, for example, generates the same amount of DC power. In another example, the onboard charger determines the amount of AC power that is being received from the external electric circuit via the signal from the sensor and decides to generate a lower amount of DC power. For example, when the battery has a low state of charge, the lower amount of DC power prevents an excessively high DC current that could damage the battery. In yet another example, the signal of the sensor indicates a certain value of the amplitude of the AC voltage. Based on the signal of the sensor, the onboard charger converts DC power to AC power with the proper amplitude. The sensor is, for example, a voltage sensor or a current sensor. The amount of AC power may be determined based on information of a voltage and/or a current of the AC circuit. The onboard charger compares the amount of received AC power with the desired DC power to charge the battery. In case a temperature of the battery is becoming too high, the onboard charger may decide to reduce the desired DC power of the battery. A low DC power to the battery helps to reduce the temperature of the battery. Because of the low DC power, a low AC power is desired from the external electric circuit. The onboard charger has, for example, an electrical resistor. By increasing the resistance of the electrical resistor, the onboard charger reduces the current through the AC circuit. As a result of reducing the current, the signal from the sensor changes. When the sensor provides a signal representative of the desired AC power, the current through the AC circuit is no longer reduced. So the onboard charger uses the sensor to control the amount of power transferred by the onboard charger. In another example, the sensor generates the signal based on a voltage of the AC circuit. The onboard charger uses the signal to determine how to convert between the DC power and the AC power. In case the sensor detects a voltage of 110 V, the onboard charger converts the AC power to the DC power differently than if the sensor detects a voltage of 220 V. For example, based on the detected voltage by the sensor, the onboard charger increases or decreases the voltage of the AC power to the voltage of the DC power or vice versa. In the examples above, the onboard charger has the sensor for charging the battery or for converting the AC power to DC power. The same sensor can be used to determine the arc fault in the external electric circuit. This has the benefit that no additional sensors are needed.

In an embodiment, the sensor comprises a current sensor configured to generate the signal based on an electric current in the AC circuit.

According to the embodiment, the onboard charger has a current sensor. The onboard charger detects an arc fault based on the signal generated by the current sensor. For example, an AC current from the external electric circuit flows through the sensor in the onboard charger. When an arc fault occurs in the external electric circuit, the AC current changes. Typically, an arc fault creates a variation of the AC current with a certain frequency content and/or with a certain variation over time. Because the current sensor is able to detect the AC current, the onboard charger is able to determine that an arc fault occurs in the external electric circuit.

In an embodiment, the sensor comprises a voltage sensor configured to generate the signal based on a voltage of the AC circuit.

According to the embodiment, the onboard charger has a voltage sensor. The onboard charger detects an arc fault based on the signal generated by the voltage sensor. For example, an AC voltage from the external electric circuit is applied to the sensor in the onboard charger. When an arc fault occurs in the external electric circuit, the AC voltage changes. Typically, an arc fault creates a variation of the AC voltage with a certain frequency content and/or with a certain variation over time. Because the voltage sensor is able to detect the AC voltage, the onboard charger is able to determine that an arc fault occurs in the external electric circuit.

In an embodiment, the onboard charger comprises a computing device configured to detect the arc fault based on a variation of the signal over time and/or a frequency content of the signal.

According to the embodiment, the computing device receives the signal from the sensor. The computing device is, for example, configured to analyze the signal. For example, the computing device is configured to perform signal processing, such as performing a Fourier analysis. The computing device is, for example, configured to filter the signal from the sensor to remove or reduce components of the signal caused by other sources than an arc fault. For example, the filter may reduce or remove the 50 Hz or 60 Hz of the mains frequency of the AC circuit. For example, the filter reduces or removes other frequencies from the signal that are known to be caused by other sources, such as switching the power of appliances on and off. For example, the filter increases the amplitudes of frequencies in the signal caused by an arc fault to more clearly determine when an arc fault occurs. In an AC circuit, an arc fault typically creates a repetitive arc. The repetitive arc starts when the amplitude of the AC voltage exceeds a threshold. The repetitive arc is maintained as long as the amplitude of the AC voltage exceeds the threshold and disappears when the amplitude of the AC voltage becomes lower than the threshold. As a consequence of the repetitive arc, a current and/or a voltage of the AC circuit changes repetitively. The computing device is, for example, configured to identify such repetitive change to determine the presence of an arc fault.

In an embodiment, the onboard charger is configured to generate a warning signal when detecting the arc fault.

According to the embodiment, the onboard charger detects the arc fault and generates a warning signal. For example, the warning signal is sent to another component arranged in the vehicle. The other component is for example a display. The display is, for example, visible in the cabin of the vehicle. The display shows a warning indicating an arc fault has been detected. The other component is, for example, a communication device. The communication device is configured to send a text message, or any other type of message based on the warning signal. The communication device is configured to send the message to a mobile device, such as a smartphone or tablet of the owner of the vehicle. The communication device is configured to send the message to a display outside the vehicle. The display is, for example, electrically coupled to the external electric circuit. The display is, for example, arranged in the building having the external electric circuit. The communication device sends the message, for example, via Wi-Fi or Bluetooth or any other type of wireless data transfer. For example, the onboard charger is provided with a communication port to receive a network cable, such as an UTP cable or ethernet cable. The onboard charger is adapted to send the warning signal via the network cable. For example, the network cable is integrated in the plug to couple the external electric circuit to the onboard charger.

In an embodiment, the energy at the AC power is at a first voltage. The energy at the DC power is at a second voltage. The first voltage is different from the second voltage. The onboard charger is configured to convert the energy at the AC power at the first voltage to the energy at the DC power at the second voltage and/or vice versa.

According to the embodiment, the onboard charger is configured to receive the AC power with a first voltage. The first voltage has, for example, a first amplitude. The first amplitude is for example 110 V or 220 V. However, the maximum voltage of the battery of the electric vehicle is 400 V. To properly charge the battery, the onboard charger is able to convert the voltage of the AC power to the desired high voltage of the battery. In another example, the maximum voltage of the battery is 12 V. In this example, the onboard charger is able to convert the voltage of the AC power to the desired low voltage of the battery. In an example, the onboard charger is not only configured to convert the first voltage to the second voltage, but also configured to convert energy from the second voltage to the first voltage. In this example, the battery of the vehicle is configured to supply electric energy to the external electric circuit. For example, in case the electric vehicle has a solar panel, the vehicle provides electric energy to the external electric circuit in case the battery of the vehicle is fully charged. To provide the electric energy from the battery to the external electric circuit, the onboard power converts the DC power from the battery at the second voltage to the AC power of the external electric circuit at the first voltage.

In an embodiment, the onboard charger comprises a coupling device configured to electrically couple the onboard charger to the external electric circuit.

According to the embodiment, the onboard charger couples to the external electric circuit via the coupling device. The coupling device comprises, for example, a socket arranged in the vehicle to connect to a plug of the external electric circuit. The coupling device comprises, for example, a plug and a cable connected to the plug arranged at the vehicle to connect to a socket of the external electric circuit. The coupling device has, for example, an indicator light indicating if the vehicle is being charged. The coupling device has, for example, a warning light, that is activated based on the warning signal.

In an embodiment, the electric vehicle comprises an electric motor configured to drive the vehicle. The battery is configured to provide electric energy to the electric motor.

According to the embodiment, the electric vehicle is propelled by the electric motor. The electric motor is, for example, a single motor that drives multiple wheels of the vehicle, for example via a gear box and/or differential. In another example, the electric motor drives only a single wheel. For example, the electric motor is an inwheel motor, alternatively known as a hub motor. An inwheel motor is integrated in the wheel of the vehicle. The battery provides the electric energy to operate the electric motor. The electric energy from the battery is, for example, converted, before being received by the electric motor. For example, the vehicle comprises an inverter to invert the electric energy of the battery at a DC power into electric energy at an AC power.

In a second aspect of the invention, there is provided the onboard charger for use in an electric vehicle according to any one of the embodiments mentioned above. The onboard charger is configured to convert electric energy between DC power and AC power. The onboard charger is configured to be coupled to an external electric circuit to form an AC circuit to transfer the electric energy as AC power between the onboard charger and the external electric circuit. The onboard charger is configured to detect an arc fault in the AC circuit.

According to the second aspect, the onboard charger is configured to convert electric energy between DC power and AC power. The onboard charger is configured to convert electric energy from DC power to AC power, from AC power to DC power, or both from DC power to AC power and from AC power to DC power. The onboard charger is configured to be coupled to an external electric circuit, for example directly or indirectly via one or more other electric components. When coupled to the external electric circuit, the onboard charger and the external electric circuit together form an AC circuit. The electric energy as AC power is transferred from the external electric circuit to the onboard charger, from the onboard charger to the external electric circuit, or alternately from the external electric circuit to the onboard charger, and from the onboard charger to the external electric circuit.

In an embodiment, the onboard charger is configured to detect the arc fault in the external electric circuit.

In an embodiment, the onboard charger is configured to trip a safety mechanism of the external electric circuit when detecting the arc fault.

In a third aspect of the invention, there is provided a method for detecting an arc fault using an electric vehicle. The electric vehicle comprises an electric circuitry and a sensor. The method comprises the steps of:

connecting the electric circuitry to an external electric circuit to form an AC circuit;

generating a signal with the sensor based on a current and/or a voltage of the AC circuit;

detecting an arc fault in the AC circuit based on the signal.

According to the third aspect, the electric vehicle is used to detect an arc fault in the external electric circuit. The external electric circuit does not form part of the electric vehicle. This way, it is possible to detect an arc fault in the external electric circuit by simply connecting the electric vehicle via the onboard charger to the external electric circuit. The external electric circuit does not need to have its own arc fault detector.

In an embodiment, the method comprises the step of:

transferring energy between the electric circuitry and the external electric circuit under control of the signal from the sensor.

According to the embodiment, the sensor provided the signal based on the current and/or a voltage of the AC circuit. Based on the signal, energy is transferred between the electric circuit and the external electric circuit. For example, the signal indicates an AC voltage of the external electric circuit, and the energy is transferred with the same AC voltage. For example, the sensor indicates a very high AC current through the external electric circuit, and the energy is transferred with an electric current that is smaller than the AC current to prevent damage to the electric circuitry.

In an embodiment, the method comprises the step of:

tripping with the electric circuitry a safety mechanism of the external electric circuit.

According to the embodiment, the external electric circuit has a safety mechanism, such as a fuse or a circuit breaker or an earth leakage circuit breaker or a combination thereof. Most or all of the electric circuits that are suitable for charging the battery of an electric vehicle are provided with one or more of such safety mechanisms. Such electric circuits are required to have the safety mechanisms because of safety regulations. Such safety regulations state that circuit breakers and earth leakage circuit breakers are mandatory in electric circuits in housing and office buildings. When an arc fault is detected in the external electric circuit, the safety mechanism is tripped. This leads to an interruption of the external electric circuit. Because of the interruption, the arc fault stops to exist. This way, damaged caused by the arc fault is prevented or limited. In most electric circuits, the safety mechanism are arranged at an upstream location of the external electric circuit, for example in the fuse box at which a main power line is connected to various groups of electric circuits. The safety mechanisms are placed at the upstream location to ensure that if the safety mechanism is tripped, a large portion or all of the electric circuit is interrupted. By interrupting the large portion or all of the electric circuit, no voltage is applied to the electric circuit anymore, or at least over a large portion thereof. By interrupting the large portion or all of the electric circuit, no current flows through the electric circuit anymore, or at least over a large portion there off. As a result, there is a very high chance that the part of the external electric circuit in which the arc fault occurs is interrupted. Due to the interruption, the arc fault disappears, so further damage is prevented. The external electric circuit may need to be repaired to prevent the arc fault from occurring in the future. For example, damaged wiring of the external electric circuits is replaced, or electrical connections are properly reconnected.

In an embodiment, the method comprises the step of:

short-circuiting the AC circuit.

According to the embodiment, the AC circuit is short-circuited when an arc fault is detected. The external electrical circuit has a safety mechanism to protect the external electric circuit in case of a short-circuit. Without such safety mechanism, a short-circuit could easily lead to fire and/or destroy part of the external electrical circuit. Safety mechanisms to protect against short-circuiting are very common and mandatory in most applications, especially for electric circuits having a voltage of 50 V or more. Such safety mechanism include fuses and circuit breakers. The short-circuiting of the AC circuit causes the tripping of the safety mechanism. By tripping the safety mechanism, the external electrical circuit is interrupted, causing the arc fault to disappear.

In a fourth aspect of the invention, there is provided a computer program having instructions which when executed by a computing device of an onboard charger coupled to an external electric circuit to form an AC circuit, cause the onboard charger, to perform the steps of:

generating a signal based on a current and/or a voltage of the AC circuit;

detecting an arc fault in the AC circuit based on the signal.

According to the fourth aspect, the onboard charger is coupled to the external electric circuit to form the AC circuit. The computer program is executed by the computing device. When the computing device executes the computer program, the onboard charger is controlled to generate the signal based on the current and/or the voltage of the AC circuit. For example, the onboard charger has a sensor to generate the signal based on the current and/or the voltage of the AC circuit. When the computing device executes the computer program, the onboard charger is controlled to detect the arc fault in the AC circuit based on the signal. For example, the computing device is configured to detect the arc fault based on signal processing of the signal from the sensor.

In an embodiment, the computer program causes the onboard charger to perform the step of:

tripping a safety mechanism of the external electric circuit.

According to the embodiment, when the computing device executes the computer program, the onboard charger trips the safety mechanism when an arc fault is detected. For example, the onboard charger flips a switch to cause a short-circuit in the AC circuit. In an example, the onboard charger flips a switch to cause a current to flow to a ground wire.

In an embodiment, the step of detecting the arc fault in the AC circuit based on the signal comprises the steps of:

detecting a variation of the signal over time and/or detecting a frequency content of the signal.

According to the embodiment, when the computing device executes the computer program, the onboard charger is able to detect a variation of the signal from the sensor and/or is able to detect a frequency content of the signal of the sensor. Based on the variation and/or the frequency content, the onboard charger is able to determine if an arc fault occurs.

In an embodiment, when executing the computer program by the computing device, the computer program causes the onboard charger to perform the step of:

generating a warning signal when detecting the arc fault.

Figure 2:
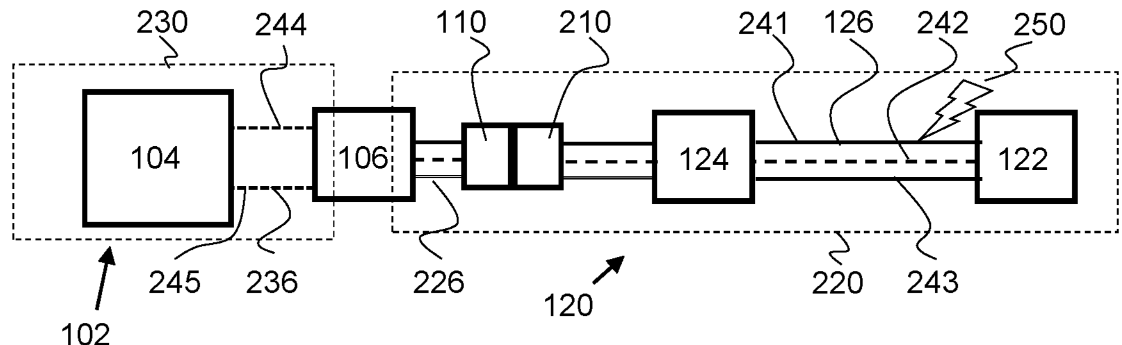

The invention will be described in more detail below under reference to the figures. In the figures embodiments of the invention are shown. The figures show in:

FIG. 1: a vehicle according to an embodiment of the invention,

FIG. 2: an onboard charger according to the embodiment of the invention.

Figure 3:
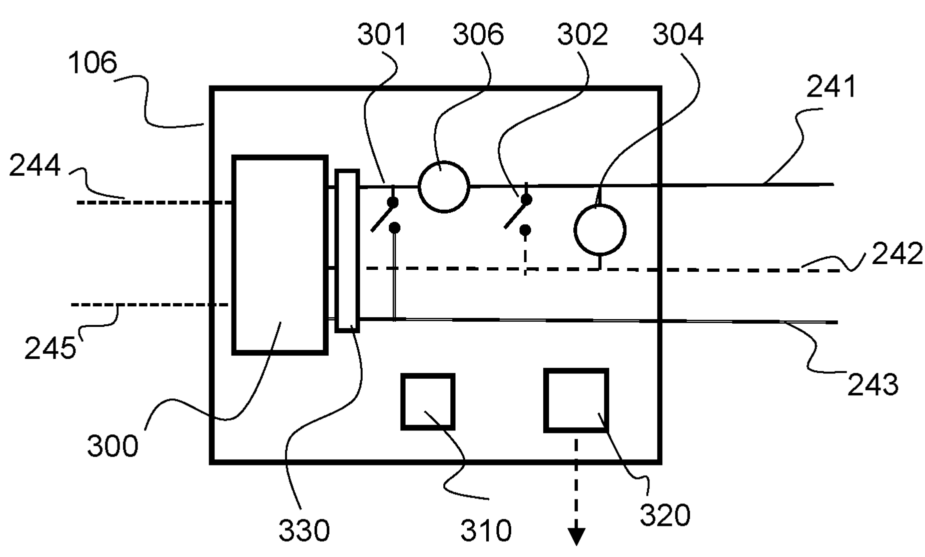

FIG. 3: a detail of the onboard charger according to the embodiment of the invention.

Figure 4:
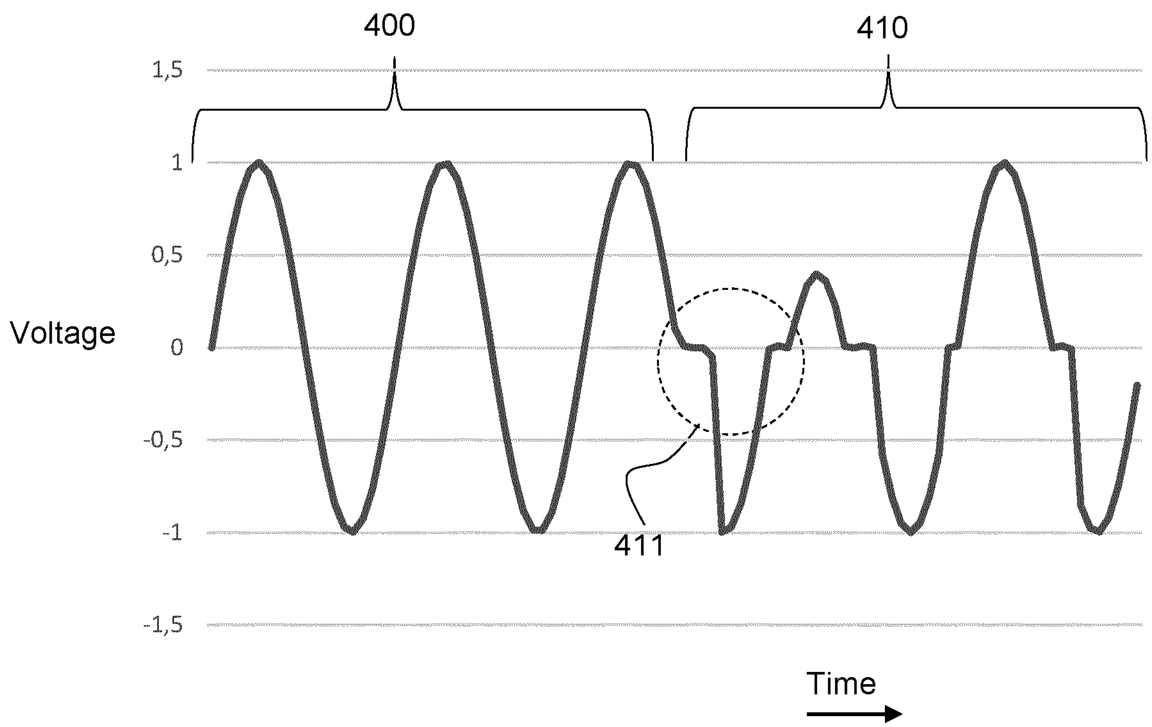

FIG. 4: a variation over time of a signal as measured with the onboard charger according to the embodiment of the invention.

Figure 5:
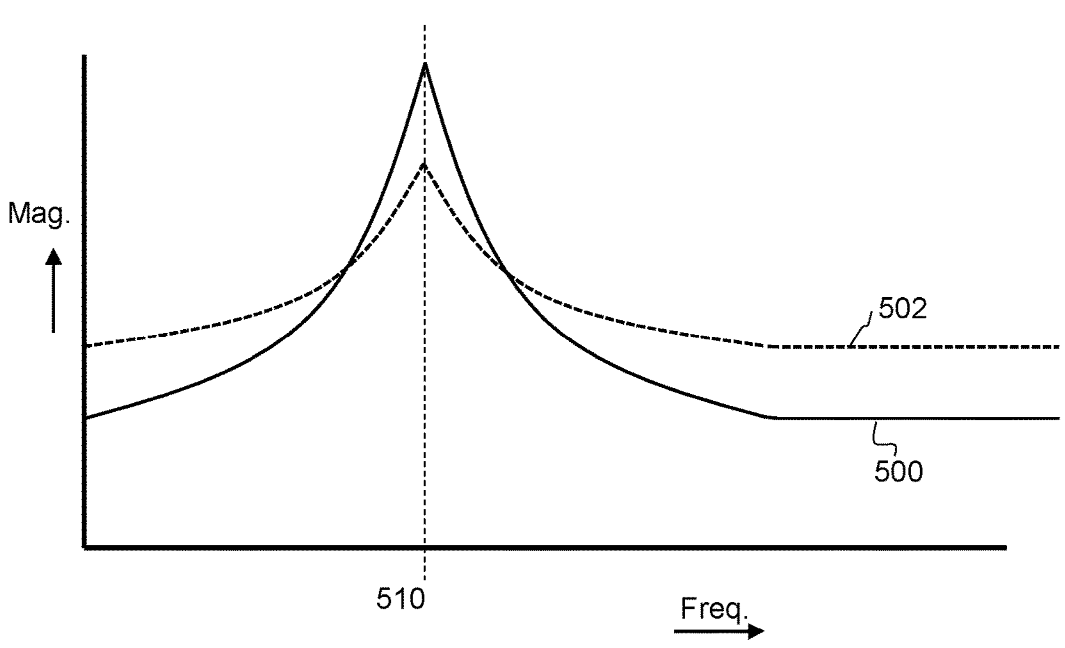

FIG. 5: a frequency content of a signal as measured with the onboard charger according to the embodiment of the invention.

Figure 6:
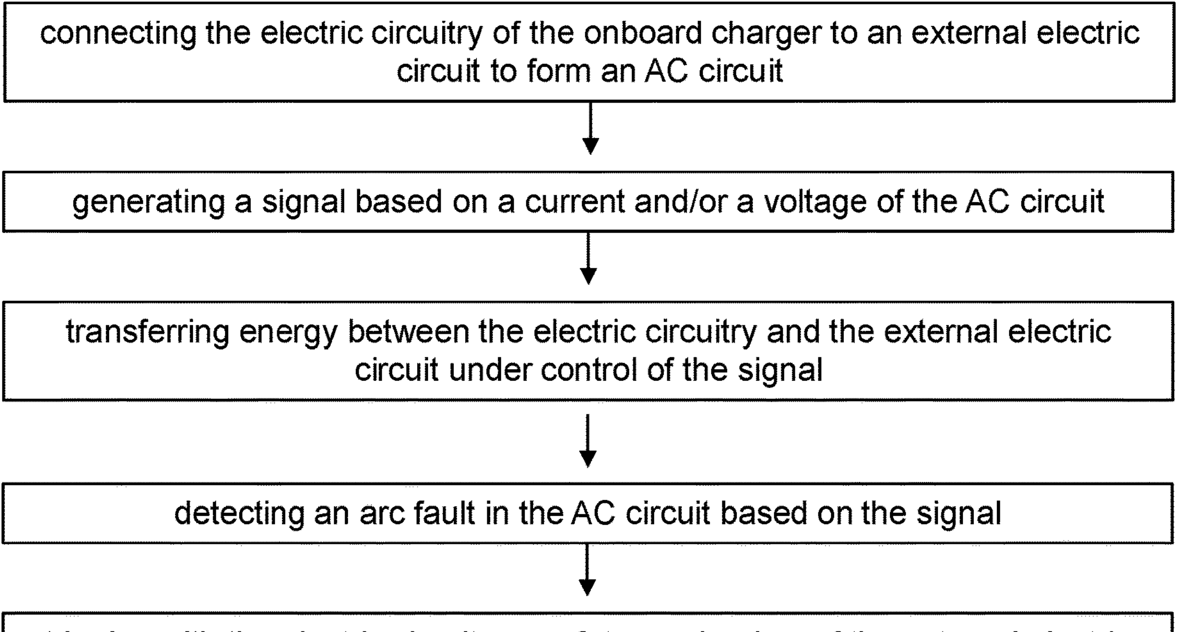

FIG. 6: a method according to a second embodiment of the invention.

FIG. 1 depicts a vehicle 100 according to an embodiment of the invention. The electric vehicle 100 comprises an electric circuitry 102. The electric circuitry 102 comprises a battery 104 and an onboard charger 106. The battery 104 is configured to store electric energy. The electric vehicle 100 has four wheels and four electric motors 131-134. Each of the electric motors 131-134 is coupled to one of the four wheels. Each of the electric motors 131-134 drives one of the four wheels. The battery 104 is connected to the electric motors 131-134 and provides electric energy to the electric motors 131-134 to drive the electric vehicle 100.

The onboard charger 106 comprises a coupling device 110. The coupling device 110 is configured to electrically couple the onboard charger 106 to an external electric circuit 120. The external electric circuit 120 comprises a fuse box 122, AC wiring 126 and a charging station 124. The AC wiring 126 connects the fuse box 122 and the charging station 124 to each other. Electric energy is provided from the fuse box 122 to the charging station 124 via the AC wiring 126.

FIG. 2 depicts a schematic drawing of the onboard charger 106 according to the embodiment of the invention. The onboard charger 106 and the battery 104 are arranged to form a DC circuit 230 to transfer the electric energy as DC power between the onboard charger 106 and the battery 104. The DC power through the DC circuit 230 is characterized by a DC voltage and a DC current. A coupling interface 210 is connected to the charging station 124. The coupling interface 210 is adapted to couple with the coupling device 110 of the electric vehicle 100. For example, the coupling interface 210 is a plug, whereas the coupling device 110 is a socket, or vice versa. The coupling interface 210 is connected to the charging station 124 via an electric wire.

The fuse box 122, the AC wiring 126, the charging station 124, the coupling interface 210, the coupling device 110 and the onboard charger 106 form an AC circuit 220 when coupled together. The AC power through the AC circuit 220 is characterized by an AC voltage and an AC current. The onboard charger 106 is configured to transfer the electric energy as AC power between the onboard charger 106 and the external electric circuit 120.

A part of the onboard charger 106 forms part of the DC circuit 230, whereas another part of the onboard charger 106 forms part of the AC circuit 220. The onboard charger 106 is configured to convert the electric energy between the DC power and the AC power.

The AC wiring 126 has a phase wire 241, a neutral wire 242 and a ground wire 243. In the AC circuit 220, an AC voltage is applied to the phase wire 241. The DC wiring 236 has a positive DC wire 244 and a negative DC wire 245.

In case the electric vehicle 100 is coupled to the external electric circuit 120, and the onboard charger 106 charges the battery 104 with electric energy from the external electric circuit 120, an AC current flows through the phase wire 241 and the neutral wire 242. The onboard charger 106 converts the AC power characterized by the AC voltage and the AC current in the AC circuit 220. The onboard charger 106 converts the AC power to DC power. The energy at the AC power is at a first voltage. The onboard charger 106 is configured to convert the energy at the AC power at the first voltage to energy at the DC power at a second voltage. The second voltage is a voltage that is suitable to charge the battery 104. The second voltage is a DC voltage. When the onboard charger 106 coverts the AC power to the DC power, a DC current flows through the positive DC wire 244 and the negative DC wire 245 of the DC wiring 236. The DC power is characterized by the DC voltage and the DC current.

In case the electric vehicle 100 is coupled to the external electric circuit 120, the battery 104 may be used to provide electric energy to the external electric circuit 120. In this case, a DC current flows through the DC circuit 230 at a DC voltage. The onboard charger 106 converts the DC power characterized by the DC voltage and the DC current in the DC circuit 230 to an AC power. The onboard charger 106 is configured to convert the DC power at the DC voltage to AC power at an AC voltage. The AC voltage is a voltage that is suitable for use in the external electric circuit 120. When the onboard charger 106 coverts the DC power to the AC power, an AC current flows through the phase wire 241 and the neutral wire 242. The AC power is characterized by the AC voltage and the AC current.

The external electric circuit 120 may suffer from an arc fault 250. The arc fault 250 is, for example, caused by a poor connection in the external electric circuit 120, or by damage to the electrical insulation of the AC wiring 126. The arc fault 250 causes a changing in the AC voltage and/or the AC current of the AC circuit 220. Because the onboard charger 106 forms part of the AC circuit 220, the onboard charger 106 is able to detect the arc fault 250.

FIG. 3 depicts a detail of the onboard charger 106 according to the embodiment of the invention. The onboard charger 106 comprises a power converter 300, a first switch 301, a second switch 302, a voltage sensor 304, a current sensor 306 and a computing device 310.

The power converter 300 is connected to the phase wire 241 and the neutral wire 242 of the AC circuit 220 to receive AC power from the external electric circuit 120. The power converter 300 is also connected to the ground wire 243 of the AC circuit 220. The power converter 300 is connected to the positive DC wire 244 and the negative DC wire 245 of the DC circuit 230 to provide DC power to the battery 104. The power converter 300 is configured to convert the AC power to DC power. Optionally, the power converter 300 is configured to convert the DC power from the DC circuit 230 to AC power for the AC circuit 220.

The current sensor 306 is arranged in the phase wire 241. The current sensor 306 receives the AC current from the AC circuit 220 when the battery 104 is being charged. The current sensor 306 is configured to generate a signal based on the AC current in the AC circuit 220. In case an arc fault 250 occurs in the external electric circuit 120, the current sensor 306 detects a characteristic change of the AC current. The current sensor 306 generates a signal based on the characteristic change of the AC current.

The voltage sensor 304 is arranged between the phase wire 241 and the neutral wire 242 to detect an AC voltage between the phase wire 241 and the neutral wire 242. The voltage sensor 304 is configured to generate a signal based on the AC voltage of the AC circuit 220. The voltage sensor 304 is able to detect the AC voltage even when no energy is being transferred between the onboard charger 106 and the external electric circuit 120. In case an arc fault 250 occurs in the external electric circuit 120, the voltage sensor 304 detects a characteristic change of the AC voltage. The voltage sensor 304 generates a signal based on the characteristic change of the AC voltage.

Optionally, the onboard charger 106 comprises a low-pass filter 330 configured to filter the AC power signal as received by the onboard charger 106, i.e. the AC power from the external circuit 120. In the arrangement as shown, the low-pass filter 330 is arranged upstream of the power converter 300 and downstream of the voltage sensor 304 and the current sensor 306. In the embodiment as shown, the low-pass filter (330) is thus arranged in the AC circuit 220.

Optionally, the onboard charger 106 converts the electric energy between DC power and AC power under control of the signal from the voltage sensor 304 and/or current sensor 306.

The computing device 310 is configured to detect the arc fault 250 based on a variation of the signal over time and/or a frequency content of the signal. The computing device 310 receives the signal from the current sensor 306, the signal from the voltage sensor 304, or both the signals from the current sensor 306 and the voltage sensor 304. The computing device 310 performs signal processing on the signal or signals to determine whether an arc fault 250 has occurred. This way, the onboard charger 106 is configured to detect the arc fault 250 in the external electric circuit 120.

In case the onboard charger 106 detects an arc fault 250, the onboard charger 106 trips a safety mechanism of the external electric circuit 120. When the onboard charger 106 detects the arc fault 250, the onboard charger 106 flips the first switch 301 from an open position to a closed position. In the open position, the first switch 301 does not connect the phase wire 241 with the ground wire 243. In the closed position, the first switch 301 connects the phase wire 241 with the ground wire 243. Because the phase wire 241 is connected to the ground wire 243 when the first switch 301 is in the closed position, a current starts to flow from the phase wire 241 to the ground wire 243. As a result, the current through the phase wire 241 becomes different from the current through the neutral wire 242. An earth leakage breaker circuit in the fuse box 122 of the external electric circuit 120 detects that there is a difference between the current through the phase wire 241 and the neutral wire 242. As a result, earth leakage breaker circuit interrupts the external electric circuit 120.

In addition or alternatively to flipping the first switch 301, when the onboard charger 106 detects the arc fault 250, the onboard charger 106 flips the second switch 302 from an open position to a closed position. In the open position, the second switch 302 does not connect the phase wire 241 with the neutral wire 242. In the closed position, the second switch 302 connects the phase wire 241 with the neutral wire 242. Because the phase wire 241 is directly connected to the neutral wire 242 when the second switch 302 is in the closed position, the AC circuit 220 is short-circuited. A large current flows from the phase wire 241 via the second switch 302 to the neutral wire 242. The large current increases to a value that causes a circuit breaker or a fuse in the fuse box 122 of the external electric circuit 120 to interrupt the external electric circuit 120.

The onboard charger 106 is configured to generate a warning signal when detecting the arc fault 250. The onboard charger 106 comprises a communication device 320. When the onboard charger 106 detects the arc fault 250, the communication device 320 sends a warning signal. The communication device 320 sends the warning signal, for example, to a display or a mobile device to warn the user of the vehicle 100 the arc fault 250 has occurred. The warning signal indicates, for example, that an arc fault has been detected and an electrical engineer should examine the external electric circuit to find the cause of the arc fault.

FIG. 4 depicts a variation of time of a signal as measured with an onboard charger 106 according to the embodiment of the invention. FIG. 4 depicts a graph with time on the x-axis and a value representing a voltage on the y-axis. The graph represents the signal provided by the voltage sensor 304 measuring the AC voltage of the AC circuit 220. The values of the voltage has been represented as a normalized value between −1 and +1. Depending on the voltage of the AC circuit 220, the voltage may range from −110 V to +110 V, from −220 V to +220 V, from −340 V to +340 V or any other range. The time on the x-axis has been indicated to increase when moving from left to right along the graph. The time values depend on the mains frequency of the AC voltage, for example 50 Hz or 60 Hz or any other suitable frequency.

The graphs shows a time period 400 at which no arc fault occurs. In the time period 400, the voltage sensor 304 measures a voltage that changes over time in a sine shape. Some small variations on the sine shape may occur. In the time period 410, an arc fault 250 occurs. As is clear from the graph, the sine shape changes and includes disturbances 411. These disturbances 411 are typical for an arc fault 250. By detecting the disturbances 411 with the voltage sensor 304, the onboard charger 106 is able to detect the arc fault 250.

FIG. 5 depicts a frequency content of a signal as measured by the onboard charger 106 according to the embodiment of the invention. FIG. 5 depicts a graph with frequencies on the x-axis and a magnitude of those frequencies on the y-axis. The graph represents the frequency content of the signal provided by the voltage sensor 304 measuring the AC voltage of the AC circuit 220. A similar graph is for example made based on the signal from the current sensor 306. The values of the frequencies and the magnitudes are left out of the figure, because these depend on various factors, such as the mains frequency of the AC circuit 220, the amplitude of the AC voltage and the amplitude of the AC current.

Line 500 shows the frequency content of the signal when no arc fault occurs. The frequency content is mostly concentrated around the mains frequency 510 of the AC circuit 220. The mains frequency 510 is for example 50 Hz or 60 Hz. Ideally, the frequency content around mains frequency 510 is a narrow spike. However, due to various disturbances in the AC circuit 220, there is a frequency band around the mains frequency 510 caused by the disturbances. In case there is no arc fault, frequencies other than the mains frequency 510 are present in the frequency content of the signal. As shown in line 500, the magnitudes of those other frequencies are much lower than the magnitude of the mains frequency 510.

Line 502 shows the frequency content of the signal when the arc fault 250 occurs. Due to the arc fault 250, the amplitudes of frequencies other than the mains frequency 510 increase in the signal. As a result, the magnitude of the main frequency 510 reduces, whereas the magnitudes of frequencies other than frequency 510 increase. This makes that the signal has a lower magnitude for the mains frequency 510 when the arc fault 250 occurs compared to when the arc fault 250 does not occur. The signal has a higher magnitude for a frequency other than the mains frequency 510 when the arc fault 250 occurs compared to when the arc fault 250 does not occur. Based on the change in the frequency content, the onboard charger 106 is able to detect an arc fault 250 occurs. For example, the onboard charger 106 detects the arc fault 250 when the change of the frequency content exceeds a threshold.

FIG. 6 depicts a method according to a second embodiment of the invention. The method is for detecting an arc fault 250 using an electric vehicle 100. The electric vehicle 100 comprises an electric circuitry 102 and a sensor 304, 306. The method comprises the following steps. The first step is connecting the electric circuitry 102 to an external electric circuit 120 to form an AC circuit 220. The second step is generating a signal, for example with the sensor, based on a current and/or a voltage of the AC circuit 220. The third step is transferring energy between the electric circuitry 102 and the external electric circuit 120 under control of the signal. The fourth step is detecting an arc fault 250 in the AC circuit 220 based on the signal. The fifth step is tripping with the electric circuitry 102 a safety mechanism of the external electric circuit 120. The tripping of the safety mechanism is for example done by short-circuiting the AC circuit 220.

As required, this document describes detailed embodiments of the present invention.

The various terms used in the description should not be interpreted as restrictive but rather as a comprehensive explanation of the invention.

The word "a" used herein means one or more than one, unless specified otherwise. The phrase "a plurality of" means two or more than two. The words "comprising" and "having" do not exclude the presence of more elements.

The invention claimed is:

1. An electric vehicle comprising an electric circuitry,
wherein the electric circuitry comprises a battery and an onboard charger,
wherein the battery is configured to store electric energy,
wherein the onboard charger and the battery are arranged to form a DC circuit to transfer the electric energy as DC power between the onboard charger and the battery,
wherein the onboard charger is configured to convert the electric energy between DC power and AC power,
wherein the onboard charger is configured to be coupled to an external electric circuit to form an AC circuit to transfer the electric energy as AC power between the onboard charger and the external electric circuit,
wherein the onboard charger is configured to detect an arc fault in the AC circuit.

2. The electric vehicle according to claim 1, wherein the onboard charger is configured to detect the arc fault in the external electric circuit.

3. The electric vehicle according to claim 2, wherein the onboard charger is configured to trip a safety mechanism of the external electric circuit when detecting the arc fault.

4. The electric vehicle according to claim 3, wherein the onboard charger is configured to trip the safety mechanism of the external electric circuit by creating a short circuit in the AC circuit.

5. The electric vehicle according to claim 3, wherein the onboard charger is configured to be coupled to a ground wire of the external electric circuit, wherein the onboard charger is configured to trip the safety mechanism by providing a current and/or a voltage to the ground wire.

6. The electric vehicle according to claim 1, wherein the onboard charger comprises a sensor configured to generate a signal based on a property of the AC circuit, wherein the onboard charger is configured to detect the arc fault based on the signal.

7. The electric vehicle according to claim 6, wherein the onboard charger is configured to convert the electric energy between DC power and AC power under control of the signal from the sensor.

8. The electric vehicle according to claim 6, wherein the sensor comprises a current sensor configured to generate the signal based on an electric current in the AC circuit.

9. The electric vehicle according to claim 6, wherein the sensor comprises a voltage sensor configured to generate the signal based on a voltage of the AC circuit.

10. The electric vehicle according to claim 6, wherein the onboard charger comprises a low-pass filter arranged in the AC circuit.

11. The electric vehicle according to claim 10, wherein the onboard charger comprises a power converter, configured to convert the electric energy between DC power and AC power, the low-pass filter being arranged upstream of the power converter and downstream of the sensor.

12. The electric vehicle according to claim 6, wherein the onboard charger comprises a computing device configured to detect the arc fault based on a variation of the signal over time and/or a frequency content of the signal.

13. The electric vehicle according to claim 1, wherein the onboard charger is configured to generate a warning signal when detecting the arc fault.

14. The electric vehicle according to claim 1, wherein the energy at the AC power is at a first voltage, wherein the energy at the DC power is at a second voltage, wherein the first voltage is different from the second voltage, wherein the onboard charger is configured to convert the energy at the AC power at the first voltage to the energy at the DC power at the second voltage and/or vice versa.

15. The electric vehicle according to claim 1, wherein the onboard charger comprises a coupling device configured to electrically couple the onboard charger to the external electric circuit.

16. The electric vehicle according to claim 1, comprising an electric motor configured to drive the electric vehicle, wherein the battery is configured to provide electric energy to the electric motor.

17. An onboard charger for use in an electric vehicle according to claim 1, wherein the onboard charger is configured to convert electric energy between DC power and AC power, wherein the onboard charger is configured to be coupled to an external electric circuit to form an AC circuit to transfer the electric energy as AC power between the onboard charger and the external electric circuit, wherein the onboard charger is configured to detect an arc fault in the AC circuit.

18. The onboard charger according to claim 17, configured to detect the arc fault in the external electric circuit.

19. The onboard charger according to claim 18, configured to trip a safety mechanism of the external electric circuit when detecting the arc fault.

20. A method for detecting an arc fault using an electric vehicle, the electric vehicle comprising an electric circuitry comprising a battery and an onboard charger, and a sensor, the method comprises the steps of:

connecting the electric circuitry to an external electric circuit to form an AC circuit;

generating a signal with the sensor based on a current and/or a voltage of the AC circuit;

detecting, by the onboard charger, an arc fault in the AC circuit based on the signal.

21. The method according to claim 20, comprising the step of:

transferring energy between the electric circuitry and the external electric circuit under control of the signal from the sensor.

22. The method according to claim 20, comprising the step of:

tripping with the electric circuitry a safety mechanism of the external electric circuit.

23. The method according to claim 22, comprising the step of:

short-circuiting the AC circuit.

* * * * *